(12) United States Patent
Davis et al.

(10) Patent No.: US 11,042,637 B1
(45) Date of Patent: Jun. 22, 2021

(54) MEASURING CODE SHARING OF SOFTWARE MODULES BASED ON FINGERPRINTING OF ASSEMBLY CODE

(71) Applicant: EMC IP Holding Company LLC, Hopkinton, MA (US)

(72) Inventors: Sashka T. Davis, Vienna, VA (US); Kevin Bowers, Melrose, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 621 days.

(21) Appl. No.: 15/886,349

(22) Filed: Feb. 1, 2018

(51) Int. Cl.
| G06F 21/56 | (2013.01) |
| G06F 8/75 | (2018.01) |
| G06F 21/55 | (2013.01) |
| G06F 16/25 | (2019.01) |

(52) U.S. Cl.
CPC .......... G06F 21/564 (2013.01); G06F 8/751 (2013.01); G06F 21/552 (2013.01); G06F 16/25 (2019.01)

(58) Field of Classification Search
CPC ...... G06F 21/564; G06F 21/552; G06F 8/751; G06F 16/25
USPC .......................................................... 726/24
See application file for complete search history.

(56) References Cited

U.S. PATENT DOCUMENTS

| 7,539,824 | B2 | 5/2009 | Lolayekar et al. |
| 7,849,295 | B2 * | 12/2010 | Sugimoto ........... G06F 9/30018 |
| | | | 712/226 |
| 7,930,476 | B1 | 4/2011 | Castelli et al. |
| 8,082,330 | B1 | 12/2011 | Castelli et al. |
| 8,095,764 | B1 | 1/2012 | Bauer et al. |
| 8,151,048 | B1 | 4/2012 | Premkumar et al. |
| 8,255,803 | B1 | 8/2012 | McAdam et al. |
| 8,473,678 | B1 | 6/2013 | Rajasekaran et al. |

(Continued)

OTHER PUBLICATIONS

Jesse Kornblum, "Identifying Almost Identical Files Using Context Triggered Piecewise Hashing," Digital Investigation: The International Journal of Digital Forensics & Incident Response, Sep. 2006, pp. 91-97, vol. 3.

(Continued)

*Primary Examiner* — Farid Homayounmehr
*Assistant Examiner* — Sanchit K Sarkerz
(74) *Attorney, Agent, or Firm* — Ryan, Mason & Lewis, LLP

(57) ABSTRACT

A method includes obtaining assembly code of a first software module, the assembly code comprising one or more assembly functions each comprising at least one basic block. The method also includes computing fingerprints of the basic blocks of the first software module by application of a fuzzy hash function, generating a representation of the first software module as a set of assembly functions each represented as a sequence of fingerprints of its associated basic blocks, and determining a similarity score between the first software module and at least a second software module classified as a given software module type. The similarity score is based on distances between the fingerprints of the basic blocks of the assembly functions of the first software module and corresponding fingerprints of the second software module. The method further includes determining a measure of code sharing between the first and second software modules based on the similarity score.

20 Claims, 7 Drawing Sheets

(56) References Cited

U.S. PATENT DOCUMENTS

| | | | | |
|---|---|---|---|---|
| 2003/0023950 | A1* | 1/2003 | Ma | G06F 30/33 717/102 |
| 2004/0111719 | A1* | 6/2004 | Civlin | G06F 8/60 717/159 |
| 2004/0243692 | A1 | 12/2004 | Arnold et al. | |
| 2005/0183072 | A1* | 8/2005 | Horning | G06F 21/125 717/140 |
| 2005/0289325 | A1* | 12/2005 | Sheaffer | G06F 9/30076 712/210 |
| 2006/0075191 | A1 | 4/2006 | Lolayekar et al. | |
| 2009/0320033 | A1 | 12/2009 | Gokhale et al. | |
| 2013/0185798 | A1* | 7/2013 | Saunders | G06F 21/563 726/24 |
| 2015/0172303 | A1* | 6/2015 | Humble | H04L 63/1408 726/23 |
| 2015/0186648 | A1* | 7/2015 | Lakhotia | G06F 21/563 726/22 |
| 2016/0127398 | A1* | 5/2016 | Cohen | G06F 8/71 726/23 |
| 2016/0147517 | A1* | 5/2016 | Vicovan | G06F 11/3636 717/140 |
| 2016/0261612 | A1* | 9/2016 | Mesdaq | H04L 63/1416 |
| 2017/0028993 | A1* | 2/2017 | Addison | G05B 19/04 |

OTHER PUBLICATIONS

D. Andriesse et al., "Compiler-Agnostic Function Detection in Binaries," Proceedings of the 2nd IEEE European Symposium on Security and Privacy (EuroS&P), Apr. 2017, pp. 177-189.

Github, "Clone of "Compiler-Agnostic Function Detection in Binaries" Source Code," https://github.com/uxmal/nucleus, Jan. 18, 2018, 2 pages.

* cited by examiner

```
function 0: entry@0x0000000000401000 25 bytes
BB@0x0000000000401000
BB@0x000000000040100d BB @0x0000000000401000 (score 1.0000000000) ----{
  0x0000000000401000    push          esi
  0x0000000000401001    lea           eax, dword ptr [esp + 8]
  0x0000000000401005    push          eax
  0x0000000000401006    mov           esi, ecx
  0x0000000000401008    call          0x42dd40
  --A ancestors:
  --A 0x00000000004259a3 (call)
  --T targets:
  --T 0x0000000000042dd40 (call)
  --T 0x000000000040100d (fallthrough)
}
BB @0x000000000040100d (score 1.0000000000) ----{
  0x000000000040100d    mov           dword ptr [esi], 0x4743c8
  0x0000000000401013    mov           eax, esi
  0x0000000000401015    pop           esi
  0x0000000000401016    ret           4
  --A ancestors:
  --A 0x0000000000401008 (fallthrough)
}
```

FIG. 3

```
BB @0x0000000000401000
    push    esi
    lea     eax, dword ptr [esp + 8]
    push    eax
    mov     esi, ecx
    call    0x42dd40
BB @0x000000000040100d
    mov     dword ptr [esi], 0x4743c8
    mov     eax, esi
    pop     esi
    ret     4
```
401

```
BB @0x0000000000401000
    push    esi
    lea     eax, dword ptr [esp + 8]
    push    eax
    mov     esi, ecx
    call    HEX_ADDR
BB @0x000000000040100d
    mov     dword ptr [esi], HEX_ADDR
    mov     eax, esi
    pop     esi
    ret     4
```
403

MEASURING CODE SHARING OF SOFTWARE MODULES BASED ON FINGERPRINTING OF ASSEMBLY CODE

FIELD

The field relates generally to information security, and more particularly to detection of security threats in computer networks.

BACKGROUND

Various entities are subject to different types of security threats. Some security threats relate to networking and computer security for client devices used by members of an entity, such as a business, organization or other enterprise. Security threats of this type include malware. Malware can pose a threat to an individual user and that user's devices, as well as possibly threatening an entity associated with the user. Users or members of an entity can become victims of malware-based attacks through a variety of different infection vectors including but not limited to visiting suspicious web sites, connecting machines or devices to untrusted networks, using infected universal serial bus (USB) drives, opening suspicious e-mail attachments, etc.

SUMMARY

Illustrative embodiments of the present invention provide techniques for the measurement of code sharing between software modules, which may be utilized for classification of software modules including potentially malicious software modules such as malware.

In one embodiment, a method comprises obtaining assembly code of a first software module, the assembly code comprising one or more assembly functions each comprising at least one basic block. The method also comprises computing fingerprints of the basic blocks of the first software module by application of a fuzzy hash function and generating a representation of the first software module as a set of assembly functions, each assembly function being represented as a sequence of fingerprints of its associated basic blocks. The method further comprises determining a similarity score between the first software module and at least a second software module classified as a given software module type, the similarity score being based on distances between the fingerprints of the basic blocks of the assembly functions of the first software module and fingerprints of basic blocks of assembly functions of the second software module. The method further comprises determining a measure of code sharing between the first software module and the second software module based on the similarity score and modifying access by a given client device to the first software module responsive to the measure of code sharing between the first software module and the second software module exceeding a designated threshold. The method is performed by at least one processing device comprising a processor coupled to a memory.

The processing device may be implemented, for example, in one or more network devices in a computer network, in a security operations center of an enterprise, or in a security analytics system or other type of network security system associated with the computer network or an enterprise.

These and other illustrative embodiments include, without limitation, methods, apparatus, networks, systems and processor-readable storage media.

BRIEF DESCRIPTION OF THE DRAWINGS

FIG. 3 shows an example assembly function code in an illustrative embodiment.

FIG. 4 shows examples of transformed assembly function code in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
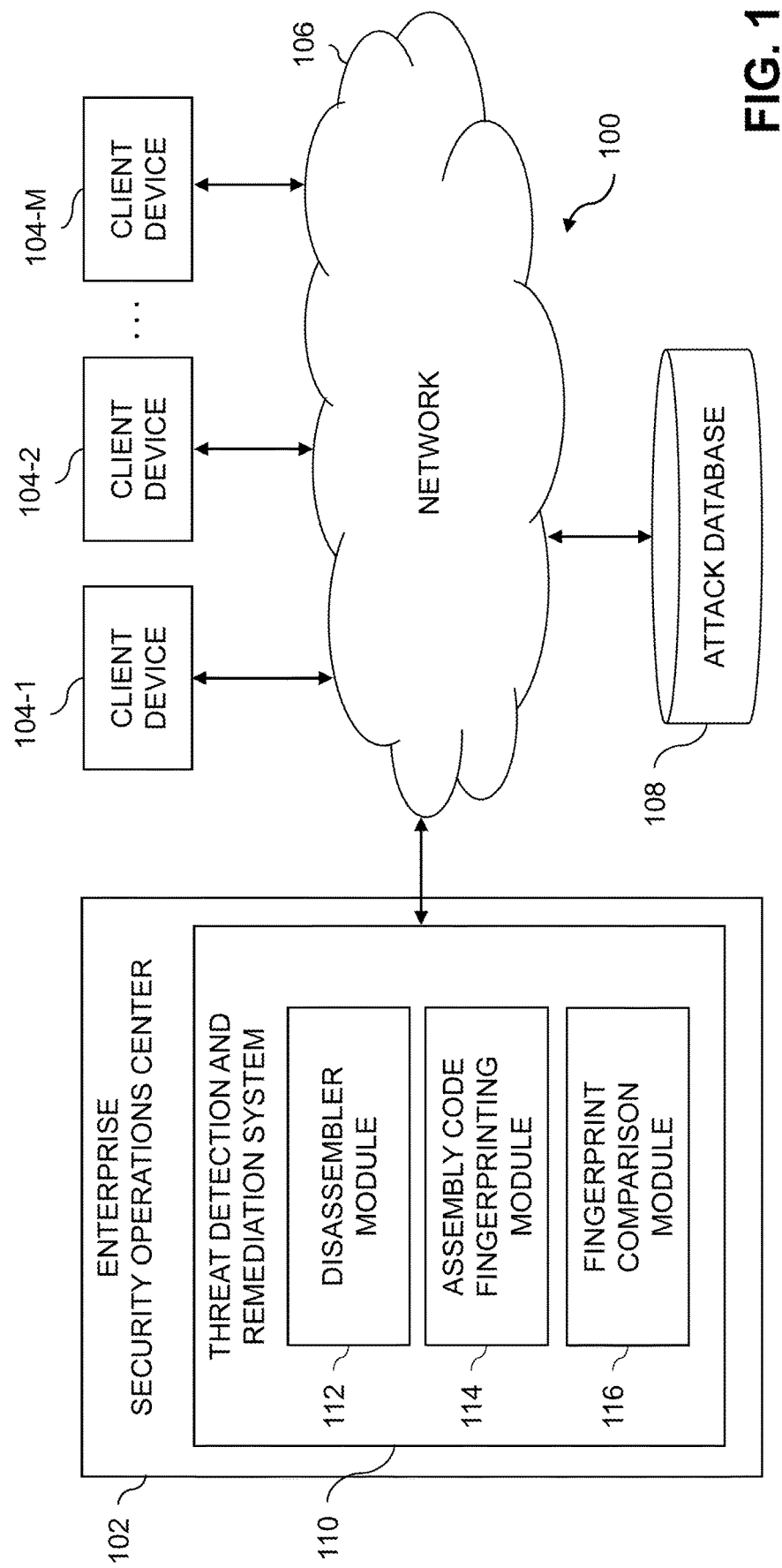
FIG. 1 is a block diagram of an information processing system for measurement of code sharing in an illustrative embodiment of the invention.

FIG. 1 shows an information processing system 100 configured in accordance with an illustrative embodiment. The information processing system 100 is assumed to be built on at least one processing platform and provides functionality for determining measures of code sharing between software modules utilizing fingerprinting of assembly function code or portions thereof. In this embodiment, the system 100 more particularly comprises an enterprise security operations center (SOC) 102 and a plurality of client devices 104-1, 104-2, . . . 104-M (collectively, client devices 104). The client devices 104 are coupled to a network 106. Also coupled to the network 106 is an attack database 108, which may store information relating to previously classified software modules. Software modules, such as binary files, may be malicious. Binary files include including executables (EXEs) and dynamic link library (DLL) modules or DLLs. Malicious software modules include but are not limited to malware and adware.

The client devices 104 may comprise, for example, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers."

The client devices 104 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing devices are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The attack database 108, as discussed above, is configured to store and record information relating to threats and attacks including information related to previously classified software modules. The attack database 108 may, in some embodiments, more particularly store a blacklist of known malicious or potentially malicious software modules such as malware, as well as other information characterizing known malicious or potentially malicious software modules including previous patterns of attack used by known malicious or potentially malicious software modules. The attack database 108 in some embodiments also stores a graylist of known or suspected adware, as well as other information characterizing known or suspected adware including previous patterns of attack used by known or suspected adware. In other embodiments, various additional or alternative information may be stored in attack database 108, such as a whitelist of known benign previously classified software modules or information associated with known benign software modules.

The attack database 108 in some embodiments is implemented using one or more storage devices associated with the enterprise SOC 102. Such storage devices may comprise, for example, storage products such as VNX® and Symmetrix VMAX® storage arrays, software-defined storage products such as ScaleIO™ and ViPR®, flash-based storage arrays, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from Dell EMC. A variety of other storage products may be utilized to implement at least a portion of the storage devices associated with the enterprise SOC 102.

Although not explicitly shown in FIG. 1, one or more input-output devices such as keyboards, displays or other types of input-output devices may be used to support one or more user interfaces to the enterprise SOC 102, as well as to support communication between the enterprise SOC 102 and other related systems and devices not explicitly shown.

In the present embodiment, alerts or notifications generated by a threat detection and remediation system 110 of the enterprise SOC 102 are provided over network 106 to client devices 104, or to a system administrator, information technology (IT) manager, or other authorized personnel via one or more security or host agents. Such security or host agents may be implemented via the client devices 104 or by other computing or processing devices associated with a system administrator, IT manager or other authorized personnel. Such devices can illustratively comprise mobile telephones, laptop computers, tablet computers, desktop computers, or other types of computers or processing devices configured for communication over network 106 with the enterprise SOC 102 and the threat detection and remediation system 110. For example, a given security or host agent may comprise a mobile telephone equipped with a mobile application configured to receive alerts from the enterprise SOC 102 or the threat detection and remediation system 110 and to provide an interface for the security agent to select particular remedial measures for responding to the alert or notification. Examples of such remedial measures include blocking access to one or more potentially malicious software modules, removing potentially malicious software modules from one or more of the client devices 104, requiring potentially malicious software modules to be run in a sandboxed or other protected environment on one or more of the client devices 104, requiring user input or authentication to obtain or run the potentially malicious software modules, triggering further review of software modules classified as potentially malicious, etc.

It should be noted that a "security agent" or "host agent" as these terms are generally used herein may comprise an automated entity, such as a software entity running on a processing device. Accordingly, a security agent or host agent need not be a human entity.

As shown in FIG. 1, the enterprise SOC 102 comprises threat detection and remediation system 110. As will be described in further detail below, the threat detection and remediation system 110 is configured to determine measures of code sharing between software modules based on fingerprinting of assembly code of disassembled binary files (binaries).

Although shown as an element of the enterprise SOC 102 in this embodiment, the threat detection and remediation system 110 in other embodiments can be implemented at least in part externally to the enterprise SOC 102, for example, as a stand-alone server, set of servers or other type of system coupled to the network 106. In some embodiments, the threat detection and remediation system 110 may be implemented at least in part within one or more of the client devices 104.

The threat detection and remediation system 110 in the FIG. 1 embodiment is assumed to be implemented using at least one processing device. Each such processing device generally comprises at least one processor and an associated memory, and implements one or more functional modules for controlling certain features of the threat detection and remediation system 110. In the FIG. 1 embodiment, the threat detection and remediation system 110 comprises a disassembler module 112, an assembly code fingerprinting module 114 and a fingerprint comparison module 116.

The disassembler module 112 is configured to obtain assembly code of software modules, with the assembly code comprising assembly functions each having one or more basic blocks. The assembly code fingerprinting module 114 is configured to compute fingerprints of the basic blocks of the software modules by application of a fuzzy hash function, and to generate representations of software modules as sets of assembly functions, with each assembly function being represented as a sequence of fingerprints of its associated basic blocks. The fingerprint comparison module 116 is configured to determine similarity scores between software modules, with the similarity scores being based on distances between fingerprints of basic blocks of the assembly functions of the different software modules. The fingerprint comparison module 116 may utilize the similarity scores to determine measures of code sharing between software modules.

The threat detection and remediation system 110 may modify access by the client devices 104 to certain software modules based on the measures of code sharing. For example, consider an unknown first software module which is compared against a known or previously-classified second software module. If the measure of code sharing between the first and second software modules exceeds a designated threshold, then the threat detection and remediation system 110 may modify access accordingly based on the previously-classified status of the second software module. If the second software module has been previously classified as malicious, then the threat detection and remediation system 110 may take remedial actions to deny access by the client devices 104 to the first software module that is determined to have some threshold measure of code sharing with the malicious second software module. If the second software module has been previously classified as benign or non-harmful, then the threat detection and remediation system 110 may permit access by the client devices 104 to the first software module that is determined to have some threshold measure of code sharing with the non-harmful second software module. It is to be appreciated that multiple thresholds may be used, such as using different thresholds based on the previously-classified status of the second software module.

In some embodiments, an analyst may have received a submitted binary file or other software module, and desires to known which other binary files or software modules are similar to the submitted binary file for context. This information allows the analyst to more quickly triage multiple binary files in question. Consider, as an example, a submitted binary file that is determined to be malware. The analyst may desire to know other binary files which share code with the submitted binary file, so as to build a picture of the evolution of a set of malware instances over time, to profile a cyber-attack by analyzing all instances involved in the attack, to perform an analysis of attribution of malware instances, etc. Thus, in some embodiments modifying access by client devices to software modules includes such scenarios and actions by an analyst. It is further to be appreciated that an analyst need not be a human analyst. Similar to the security and host agents described herein, an analyst may represent an automated entity. Machine learning networks are one example of an automated analyst.

Additional details regarding the disassembler module 112, assembly code fingerprinting module 114 and fingerprint comparison module 116 will be described in further detail below with respect to FIGS. 2-5.

It is to be appreciated that the particular arrangement of the enterprise SOC 102, threat detection and remediation system 110, disassembler module 112, assembly code fingerprinting module 114 and fingerprint comparison module 116 illustrated in the FIG. 1 embodiment is presented by way of example only, and alternative arrangements can be used in other embodiments. As discussed above, for example, the enterprise SOC 102, threat detection and remediation system 110, disassembler module 112, assembly code fingerprinting module 114 and fingerprint comparison module 116 may in some embodiments be implemented internal to one or more of the client devices 104. As another example, the functionality associated with the disassembler module 112, assembly code fingerprinting module 114 and fingerprint comparison module 116 may be combined into one module, or separated across more than two modules with the multiple modules possibly being implemented with multiple distinct processors or processing devices.

At least portions of the disassembler module 112, assembly code fingerprinting module 114 and fingerprint comparison module 116 may be implemented at least in part in the form of software that is stored in memory and executed by a processor.

It is to be understood that the particular set of elements shown in FIG. 1 for measuring code sharing of software modules is presented by way of illustrative example only, and in other embodiments additional or alternative elements may be used. Thus, another embodiment may include additional or alternative systems, devices and other network entities, as well as different arrangements of modules and other components.

By way of example, in other embodiments, the threat detection and remediation system 110 may be implemented external to enterprise SOC 102, such that the enterprise SOC 102 can be eliminated.

In some embodiments, the threat detection and remediation system 110 may be part of or otherwise associated with a system other than the enterprise SOC 102, such as, for example, a critical incident response center (CIRC), a security analytics system, a security information and event management (SIEM) system, etc.

The threat detection and remediation system 110 and other portions of the system 100, as will be described in further detail below, may be implemented at least in part using one or more processing platforms including public or private cloud infrastructure, or other distributed virtual infrastructure.

Figure 2:
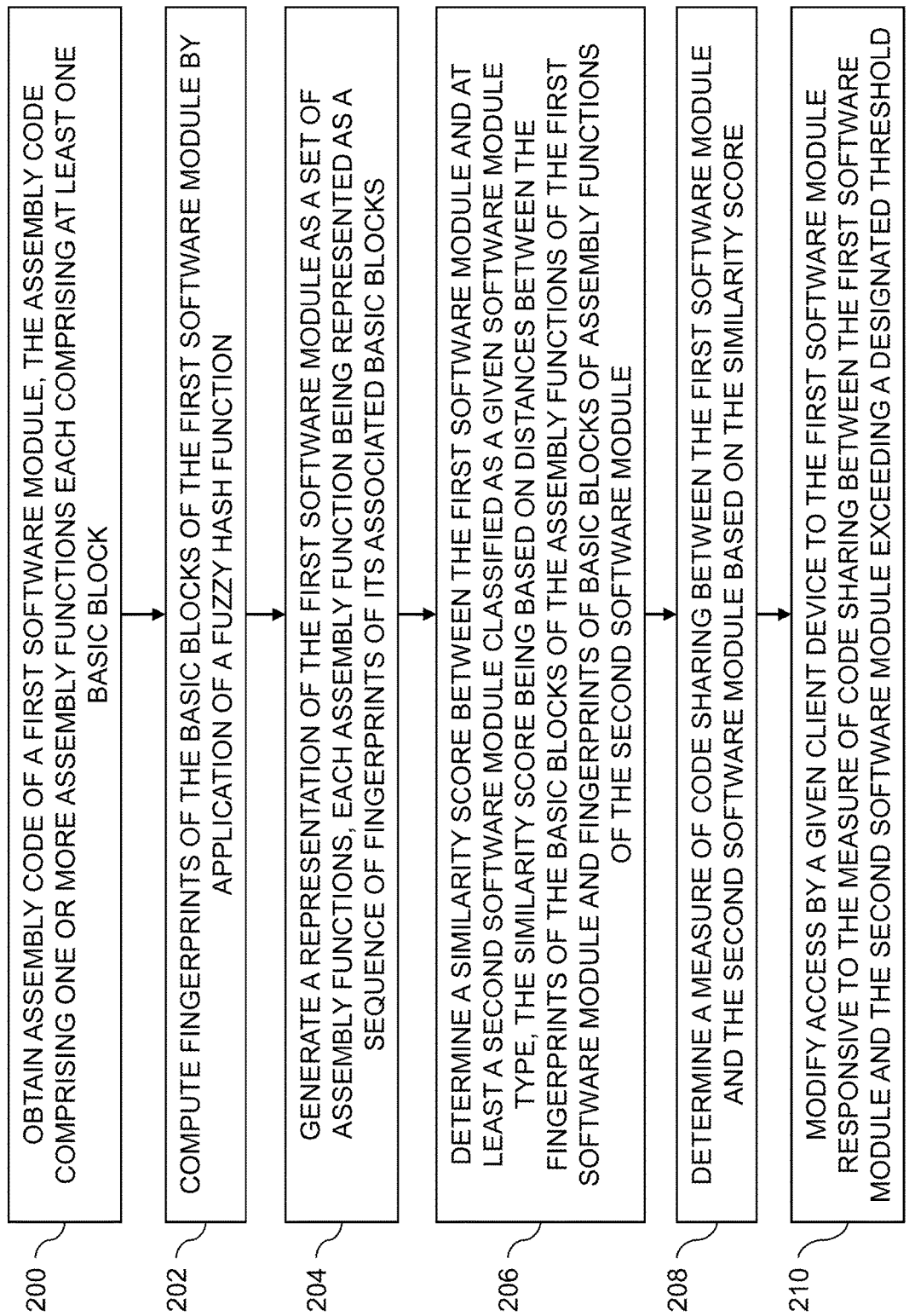
FIG. 2 is a flow diagram of an exemplary process for measurement of code sharing in an illustrative embodiment.
Figure 5:
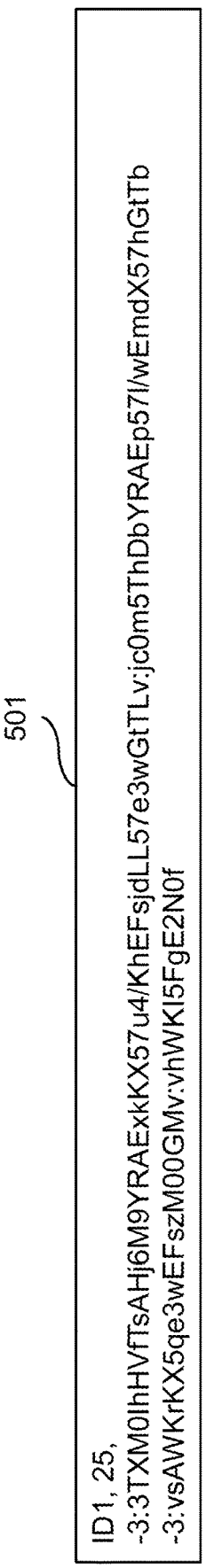
FIG. 5 shows an example of fuzzy hash fingerprints of an assembly function in an illustrative embodiment.

An exemplary process for measuring code sharing of software modules utilizing fingerprinting of assembly functions will now be described in more detail with reference to the flow diagram of FIG. 2. It is to be understood that this particular process is only an example, and that additional or alternative processes for measuring code sharing of software modules utilizing fingerprinting of assembly function code can be carried out in other embodiments.

In this embodiment, the process includes steps 200 through 210. These steps are assumed to be performed by the threat detection and remediation system 110 utilizing the disassembler module 112, assembly code fingerprinting module 114 and fingerprint comparison module 116. The process begins with step 200, obtaining assembly code of a first software module. The assembly code of the first software module comprises one or more assembly functions each of which comprises at least one basic block. The first software module may comprise a binary executable file.

In some embodiments, step 200 further includes transforming the obtained assembly code of the first software module prior to processing in step 202. The transformation of the assembly code of the first software module may include stripping hexadecimal addresses of each assembly instruction in the assembly code, retaining in sequence the assembly instructions and their arguments, and transforming operands of the assembly instructions by replacing compiler-dependent relative offsets with a designated string. The compiler-dependent relative offsets may comprise hexadecimal addresses and hexadecimal offsets, masks and numbers. In some embodiments, the transformation further includes removing no-operand assembly instructions from the assembly code of the first software module and recording a number of no-operand assembly instructions in the assembly code of the first software module. The measurement of code sharing, determined in step 208 described below, may be based on the number of no-operand assembly instructions.

The process continues with step 202, computing fingerprints of the basic blocks of the first software module by application of a fuzzy hash function. In step 204, a representation of the first software module is generated. The representation of the first software module may be as a set of assembly functions, with each assembly function being represented as a sequence of fingerprints of its associated basic blocks. The representation of a given assembly function of the first software module may comprise a unique identifier, a length of the given assembly function, and a sequence of fingerprints that follows a sequence in which the corresponding basic blocks form a body of the given assembly function. The length of the given assembly function may be measured in at least one of bytes and a number of instructions.

A similarity score between the first software module and at least a second software module is determined in step 206. The second software module may be one that has been previously classified as a given software module type (e.g., previously classified as benign, malware, adware, etc.). The similarity score may be based on distances between the fingerprints of the basic blocks of the assembly functions of the first software module and fingerprints of basic blocks of assembly functions of the second software module. In some embodiments, the similarity score may comprise function similarity scores determined utilizing fuzzy hash fingerprint compare scores to assess similarity for each pair of functions in the first and second software modules. The function similarity scores for all pairs of functions may be used to give a measure of code sharing between the first and second software modules in step 208.

Determining the similarity score in step 206 may include measuring a number of assembly functions of the first software module that have shared assembly code with the second software module, measuring a length of the assembly code of the first software module that belongs to assembly functions that have shared assembly code with the second software module, computing a fraction of the assembly functions of the first software module that have shared assembly code with the second software module, and computing a fraction of the length of the assembly code of the first software module that belongs to assembly functions that have shared assembly code with the second software module. The similarity score may be an average similarity score that is determined as a first ratio of: a sum of pairwise similarity scores for pairs of assembly functions in the first software module and the second software module that have shared assembly code; and the number of assembly functions of the first software module and the second software module that have shared assembly code. The first ratio may be weighted by the sizes of the pairs of assembly functions.

The pairwise similarity score for a given pair of assembly functions comprising a first assembly function in the first software module and a second assembly function in the second software module may comprise a second ratio of: a sum of fuzzy hash similarity scores between basic blocks of the first assembly function and the second assembly function that exceed a designated fuzzy hash threshold similarity score; and a number of basic blocks in common between the first assembly function and the second assembly function. The pairwise similarity score for the given pair of assembly functions may be based on comparing the basic blocks of the first assembly function in sequence with the basic blocks of the second assembly function. The second ratio may be weighted by the number of instructions in the basic blocks.

The process continues with step 208, determining a measure of code sharing between the first software module and the second software module based on the similarity score determined in step 206. In step 210, access by a given client device to the first software module is modified responsive to the measure of code sharing determined in step 208 exceeding a designated threshold. When the second software module is previously-classified as malicious or potentially malicious, modifying access in step 210 may include removing the first software module from a memory or storage of the given client device, preventing the given client device from obtaining the first software module, causing the first software module to be opened in a sandboxed application environment on the given client device, initiating further investigation or analysis of the first software module, etc. When the second software module is previously-classified as benign, modifying access in step 210 may include providing the given client device with access to the first software module, allowing the given client device to obtain the first software module, allowing the first software module to be opened in a normal (e.g., non-sandboxed) application environment on the given client device, initiating further investigation or analysis of the first software module, etc.

Analysis of software modules such as binary files is an important task that many enterprises perform frequently, such as daily, to prevent a variety of cyber-attacks. A cyber-attack may be considered as having a delivery stage and an install stage. The delivery stage of an attack chain often starts with an attachment, such as an e-mail attachment, being presented to an unsuspecting user. The install stage of the attack chain is where a malicious executable or other software module is installed on the victim's system, such as on one of the client devices 104 in system 100. An installed malicious software module may facilitate different types of criminal or other harmful activities, including but not limited to Command-and-Control, keylogging, harvesting of a victim's passwords, exfiltration of enterprise proprietary data, ransomware activities, etc. Computationally efficient comparison and measurement of similarity between software modules is invaluable for automatic triage and classification of malware, adware or other malicious software.

One way in which similarity between software modules may be measured is using detection of code sharing between the software modules. Detection of source code sharing between software modules such as binary files, however, is a highly non-trivial problem that may require manual reverse engineering. Embodiments provide efficient techniques for providing a quantitative measure of code sharing by analyzing assembly functions of disassembled binary files. Binary files may be disassembled with various commercial or open source disassemblers, so as to present binary files as sets of assembly functions. The assembly code of each function may be transformed into basic blocks, and then fuzzy hashing of the basic blocks is computed. The fuzzy hashes or fingerprints of the basic blocks are then utilized to efficiently determine the assembly code similarity between assembly functions in different binary files. The similarity between the assembly functions gives a quantitative measure of the code similarity and code sharing between the corresponding binary files.

Measures of code sharing may be used to determine estimates of similarity between different software modules. In some cases, the measure of code sharing may be used as one of a plurality of factors used to classify software modules. Software modules which share code, however, are not necessarily similar. Two distinct-in-behavior software modules may share a large library, and thus both software modules could be statically linked against a large common library. In such a case, all the functions of the common library might become part of the two distinct-in-behavior software modules, which should have different labels. Thus, in some embodiments the techniques for detecting or measuring shared code between software modules may be utilized, in combination with further analysis, for classification of software modules.

Malware analysis is an important problem that nearly all enterprises face today. The goal of malware analysis often is not just to certify if a given binary file is malicious or not, but also to understand the relationships between a set of distinct samples. One approach of quantifying the relationship amongst different binary files is to answer the question: given two binary files, do they share common source code, or not? Detection of code sharing between binary malware instances is extremely difficult, but if successful can help to: (1) build a picture of the evolution of a set of malware instances over time; (2) profile a cyber-attack by analyzing all instances involved in the attack; and (3) perform an analysis of attribution of the malware instances.

Most antivirus vendors use file similarity techniques which are based on signatures for detection of malware. Such approaches are based on searching for a match between a set of specially crafted strings in the binary files. Another approach to relate and detect a similarity between binary files is to compute a fuzzy hash function on entire binary files, or various sections of the binary files. If the binary files share only some fraction of source code or are compiled with different optimization options, these approaches will fail even in cases when the binary files are derived from common source code. Embodiments provide techniques for detection of similarity and code sharing between binary files utilizing quantitative measures of the code sharing between the binary files.

Detection of code sharing in some embodiments proceeds as follows. Binary executable files are considered after disassembly, such as with a commercial or open source disassembler. Various disassemblers may be used to produce assembly code of binary files, and are able to identify the boundaries of assembly functions and individual basic blocks within each assembly function. Disassembler tools may also be able to detect the assembly functions and their basic blocks regardless of the compiler used to build the binary files, or the optimization flags used. Similarity detection techniques in some embodiments are focused on determining similarity between assembly functions by inspecting and analyzing the similarity of their basic blocks. A measure of similarity between binary files is produced that shows the number of assembly functions that are shared, together with their similarity scores. These measures, combined with the length of the assembly functions (e.g., in bytes, number of instructions, etc.) will produce a number of assembly functions that are in common between corresponding binary executable files.

Assembly functions do not have to have a correspondence to source code functions. However, this is irrelevant to the analysis because binaries that share source code, even when compiled with different compiler options, will produce assembly functions that are similar (if not identical) in the binaries that are derived therefrom. If binaries are derived from common source code, even with different versions or libraries, then the corresponding compiled executables will share some assembly functions that will be proportional to the shared source code. Embodiments may be used to identify the actual assembly code of the functions that are shared between binaries. The shared assembly code can then be used for further investigation, such as by security and forensic analysts to solve problems such as building a profile of a malware attack and performing malware attribution analysis.

Disassemblers such as IDA or Nucleus at a minimum will produce: (1) a set of assembly functions; (2) for each assembly function, a set of basic blocks that form the body of the function; and (3) a control flow graph (CFG) that connects the functions and represents the flow of control of the program during the execution. Some embodiments do not utilize the CFG structure for the following reasons. First, the aim of some embodiments is to measure various degrees of source code or library sharing, which can happen even in the case when the entire structure of the program differs (as captured by the CFG). Focusing on assembly function level and basic block analysis allows for the detection and measurement of code sharing between binaries even if they use common libraries. Second, it is desired in some embodiments for analysis to be computationally efficient and scalable. The size of the CFG of most real-world programs usually consist of hundreds if not thousands of nodes, and the subgraph isomorphism problem is believed to be computationally intractable (it is known to be NP-complete). On the other side, the problem of comparing sequences for similarity can be performed fairly efficiently.

An assembly function is a sequence of one or more basic blocks. A basic block is a straight-line sequence of instructions without branches that has a single entry and a single exit point. The entry and exit points are usually branch instructions, or targets of other branches or call instructions. An assembly function could contain one basic block or an arbitrarily high number of basic blocks. Each assembly instruction has a hexadecimal address, an opcode, and 0, 1 or 2 arguments. The arguments of an assembly instruction can be names of machine registers, hexadecimal addresses, hexadecimal numbers, etc. FIG. 3 shows an example of a function 300 whose address of entry point is 0x0000000000401000 and consists of two basic blocks in sequence. The output of FIG. 3 was produced with the Nucleus disassembler and function boundary detection algorithm.

Approaches used in some embodiments (i) transform the assembly code of each basic block of each assembly function, (ii) compute a representation of each assembly function as a sequence of fuzzy hash fingerprints of its basic blocks, (iii) represent a binary file as a set of its assembly functions (where each assembly function is represented as a sequence of fuzzy hash fingerprints), and (iv) measure the code sharing and similarity between two binary files by examining pairs of assembly functions with the same or similar length through comparison of the fuzzy hash fingerprints of their basic blocks in sequence.

Fuzzy hashing can be used to compare arguments or inputs that have similar structures, such as sequences of identical bytes in the same order, although bytes between such sequences may be different in content and/or length. Fuzzy hashing can be implemented using different algorithms that fall in one of two categories: context-triggered piecewise hashing and block-based hashing.

One exemplary implementation of a fuzzy hash function is the SSDEEP function that uses an algorithm that belongs to the context-triggered piecewise hashing class. SSDEEP is symmetric, simple and efficient, and it does not take additional parameters to perform its computation. Other fuzzy hash functions provide similar capabilities for computing a short fingerprint for an argument and provide means for computing a distance between fingerprints so as to estimate similarity between the original arguments. Examples of fuzzy hash functions that belong to the class of block-based hashing are sdhash, SimHash, and mvHash-B.

A variety of fuzzy hash functions may be used for estimating the similarity of binary files (binaries), and for clustering. Fuzzy hashing utilizes a pair of functions. One function takes a character string as argument, and outputs a short fingerprint of the argument. The other function is a distance or compare function, which takes as input two fingerprints and outputs a number in some range, such as a number in the range [0,100]. The output of the compare function measures the similarity between the two fingerprints. Using the example range [0,100], the compare function output 0 means that two fingerprints are determined to be dissimilar, while a value of 100 for the compare function output means that the two fingerprints exhibit maximal similarity. It is to be appreciated that although various embodiments described herein use a range of [0,100] as the output for a compare function, this is not a requirement. Various other ranges may be used as desired.

While some embodiments described herein utilize the SSDEEP fuzzy hash function, embodiments are not so limited. Various other types of fuzzy hash functions may be utilized, including any specific implementation of a hash function that provides capabilities for computing and comparing fingerprints.

Assembly code transformation will now be described. Given an assembly function and its basic blocks, the assembly code may be transformed by: (i) stripping the hexadecimal address of each assembly instruction; (ii) keeping in sequence the instructions and their arguments only, including removal of non-ops and other instructions that have no impact on the semantics during program execution; and (iii) transforming operands of the instructions by replacing hexadecimal addresses, hexadecimal offsets, mask and numbers (as they are relative offsets and compiler dependent) with a string such as HEX_ADDR. Step (iii) includes the processing of all call/target address information included in control-flow instructions such as branch and call instructions. FIG. 4 shows examples of transformed assembly code. More particularly, element 401 illustrates transformation of the assembly function 300 after steps (i) and (ii), while element 403 illustrates transformation of the assembly function 300 after steps (i)-(iii).

After transforming the assembly code, embodiments generate representations of the assembly functions and the binary files. For each assembly function, a fuzzy hash fingerprint of each transformed basic block is computed separately. In the discussion below, it is assumed that the SSDEEP fuzzy hash function is utilized to compute a fuzzy hash fingerprint of a basic block. As noted above, however, various other fuzzy hash functions may be utilized. Each assembly function is represented with a unique identifier (e.g., ID1, ID2, etc.), the length of the assembly function (e.g., in bytes, number of instructions, etc.) and a sequence of the fuzzy hash fingerprints that follows the order in which the corresponding basic blocks form the body of the assembly function. The assembly function 300, for example, may be represented as shown in element 501 of FIG. 5. Each binary file is represented as a set of its assembly functions, with each assembly function being represented as described above (e.g., by its unique identifier, function length and a list of the fuzzy hashes computed on its transformed basic blocks in sequence).

After transforming the assembly code and generating representations of the assembly functions, code similarity between assembly functions may be measured. Given two assembly functions as an ordered sequence of fuzzy hash fingerprints, the measure of code level similarity may be determined by comparing the fuzzy hash fingerprints of the basic blocks according to their order as follows. Let $F_1$ and $F_2$ be the two assembly functions, such that $F_1$'s basic blocks are $B_{11}, B_{12}, \ldots, B_{1n}$ with fuzzy hashes ($h(B_{11})$, $h(B_{12}), \ldots, h(B_{1n})$) and $F_2$'s basic blocks are $B_{21}, B_{22}, \ldots, B_{2p}$ with fuzzy hashes ($h(B_{21}), h(B_{22}), \ldots, h(B_{2p})$).

Let FC be the compare score and FB be the number of basic blocks in common. Initially, FC=0 and FB=0. A hash similarity threshold FUZZY_THRESHOLD is set to a number between 1 and 100, with the hash similarity threshold being used to discount fuzzy hash similarity below a set level. A compare score 0 implies no similarity between two fingerprints, while a similarity score of 100 implies almost or entirely identical arguments. The value of FUZZY_THRESHOLD may be set to any desired value. In some embodiments, the value of FUZZY_THRESHOLD is set to 65. If the number of basic blocks differs between two assembly functions, basic blocks i={1,min(n, p)} are compared, and fuzzy-compare scores are accumulated as follows:

COMPARE_FUNCTION_CODE (F1, F2)
  MinBlockNumber=min(p,n)
  for i=(1,MinBlockNumber)
    block_score=fuzzy.compare($h(B_{1i}),h(B_{2i})$)
    if block_score>FUZZY_THRESHOLD
      then FC=FC+block_score
      FB=FB+1
  AverageScore=FC/FB
  return AverageScore, FB, MinBlockNumber AverageScore, MinBlockNumber, and FB give a measure of code level similarity between two assembly functions F1 and F2. The FB output is the number of basic blocks whose similarity exceeds FUZZY_THRESHOLD. The AverageScore output is the arithmetic mean of the fuzzy hash compare scores of the basic blocks with relatively high similarity (e.g., those with block_score greater than FUZZY_THRESHOLD).

Computing the similarity between two binary files may proceed as follows. Let File1 and File2 be two distinct binary files whose similarity and code sharing is to be measured. File1 and File2 are disassembled, and their representations are computed as described herein. File1's representation is $S_1=\{f_{11}, f_{12}, \ldots, f_{1k}\}$ and File2's representation is $S_2=\{f_{21}, f_{22}, \ldots, f_{2m}\}$. Each function $f_{1i}$ of File1 is compared to all functions $f_{2j}$ of File2, provided that functions $f_{1i}$ and $f_{2j}$ have the same length (or length within some designated threshold as described in further detail below). Shared code between the files File1 and File2 may thus be measured as follows:

```
MEASURE_SHARED_CODE (S₁={f₁₁,f₁₂, . . . ,f₁ₖ},
  S₂={f₂₁,f₂₂, . . . , f₂ₘ})
  AvgScore, Score = 0
  SharedCodeBytes=0
  SharedFunctions = 0
  for f ∈ S₁
    for g ∈ S₂, such that the length of f is equal to the length of g
      Score = Compare (f, g)
      if (Score > Threshold)
        AvgScore = AvgScore + Score
        SharedCodeBytes = SharedCodeBytes + length of f
        SharedFunctions = SharedFunctions + 1
```

SharedFunctions is a measure of the number of assembly functions that belong to File1 and File2 which share code, and SharedCodeBytes is a measure of the number of bytes that belong to assembly functions that share code. The average similarity score is AvgScore/SharedFunctions. For a pair of files, the fraction of assembly functions that are similar are computed, with respect to the presence of shared assembly code. In addition, for the pair of files the fraction of bytes that belong to similar assembly functions is computed.

The algorithm MEASURE_SHARED_CODE can be implemented extremely efficiently as follows. For each file, a hash table is created, whose keys are lengths of the assembly functions that belong to a given file. For each length, the corresponding value in the hash table is a list of assembly functions that have length equal to the key. Then the two "for" loops in the algorithm above thus become a simple hash table traversal.

In some embodiments described above, the length of the assembly function is measured in bytes. In other embodiments, the number of instructions of each assembly function may be used as a measure of its length. Thus, such embodiments can measure the number of instructions that belong to functions of high similarity score.

In the COMPARE_FUNCTION_CODE algorithm, the basic blocks of the two assembly functions are compared in sequence. In some embodiments, however, one basic block of a first assembly function is compared against multiple basic blocks of a second assembly function, to create a maximal matching for the basic blocks of a pair of assembly functions. This can be extended further to find a maximal matching for all blocks without overlap (e.g., a block in $S_2$ is matched to only one block in $S_1$). Large blocks may be matched first in a greedy approach to find maximal block matchings that all exceed a threshold.

The AvgScore computed in the algorithms above may be computed as a simple arithmetic mean of the fuzzy hash compare scores. A more flexible measure may be computed in some embodiments as a weighted mean of the fuzzy hash compare scores of the basic blocks, where the weighting is based on the number of instructions in the basic blocks. Such weighting may also be extended to the assembly function level, where file comparisons are based on the number of matching assembly functions weighted by the size of the assembly functions.

The comparison between $f$ and $g$ in the COMPARE_FUNCTION_CODE may be extended in some embodiments to find not just the first match greater than a threshold, but the best match by continuing to scan through $g$ and returning to the highest scoring match. If a reduction of the computational complexity is needed, then finding the optimal match can be replaced by finding a matching score greater than some threshold. The threshold may be flexible, allowing variation based on the assembly function's size (e.g., measured in bytes, number of instructions, number of basic blocks, etc.).

In the MEASURE_SHARED_CODE algorithm, similar size assembly functions can also be considered, comparing functions that are not exactly equal in length. When comparing assembly functions of similar but not equal size (as measured in bytes, number of instructions, etc.), the amount by which the sizes of the two assembly functions is allowed to differ can be an absolute value, such as $\mp N$ bytes, or $\pm k$ instructions (for some values of N and k). The sizes of the two assembly functions may also be allowed to differ by a value that is relative to the size of the assembly functions being compared. For example, 10%×(Size of Function) would allow longer assembly functions more flexibility when evaluated for similarity, compared to increased restrictions for shorter assembly functions.

In some embodiments, basic blocks must contain enough information in them to ensure that they are distinctive before comparison makes sense. A threshold, either in bytes or instructions, should be met before the basic blocks are compared, and blocks not meeting this threshold (and thus not eligible for comparison) should be removed so they do not skew the file similarity statistics. In some embodiments, the threshold may be 25 bytes, corresponding to an average length of 6 Intel® x64 assembly instructions.

No-op instructions may be removed during the assembly code transformation phase, because such instructions do not change the semantics of the program during execution. However, the number and type of no-op instructions in the basic blocks, the function, or the program overall may be recorded and further analyzed as an indication of certain behavior.

Embodiments provide efficient techniques for computing the similarity between binary files by measuring the number of assembly functions that have similar sequence assembly code instructions. Some embodiments also measure the number of bytes or number of instructions and the similarity scores between individual assembly functions. These measures can quantify the extent to which binary files share assembly code. Such techniques efficiently identify the actual assembly code that is shared amongst binary files. An unknown binary file, for example, that is determined to be similar to a known malware binary file may be subject to further investigation (e.g., by a security or forensic analyst).

It is to be appreciated that the particular advantages described above and elsewhere herein are associated with particular illustrative embodiments and need not be present in other embodiments.

Also, the particular types of information processing system features and functionality as illustrated in the drawings and described above are exemplary only, and numerous alternative arrangements may be used in other embodiments.

The information processing systems disclosed herein are illustratively implemented using one or more processing platforms, examples of which will be now be described in greater detail. A given such processing platform comprises at least one processing device comprising a processor coupled to a memory.

As mentioned previously, portions of an information processing system as disclosed herein illustratively comprise cloud infrastructure. The cloud infrastructure in some embodiments comprises a plurality of containers implemented using container host devices and may additionally or alternatively comprise other types of virtual resources such as virtual machines implemented using a hypervisor. Such cloud infrastructure can therefore be used to provide what is also referred to herein as a cloud computing environment. A given cloud computing environment may but need not accommodate multiple tenants.

The cloud infrastructure mentioned above may represent at least a portion of one processing platform. Another example of such a processing platform is a plurality of processing devices which communicate with one another over a network. Each such processing device comprises at least one processor coupled to at least one memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment.

Cloud infrastructure as disclosed herein can include cloud-based systems such as an Amazon Web Services (AWS) system. Other examples of cloud-based systems that can be used to implement at least portions of system 100 include Google Cloud Platform (GCP) and Microsoft Azure. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux container (LXC). The containers may run on virtual machines in a multi-tenant environment, although other arrangements are possible. The containers may be utilized to implement a variety of different types of functionality within the system 100. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
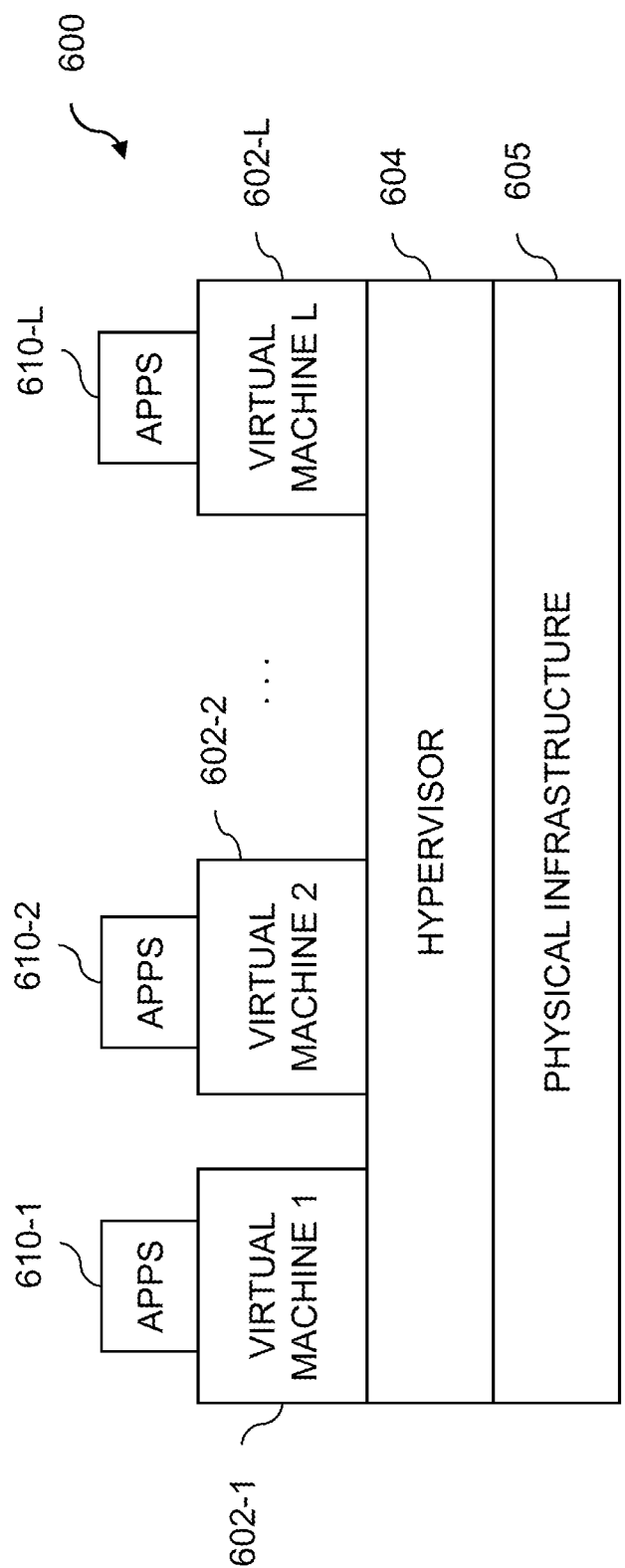
FIGS. 6 and 7 show examples of processing platforms that may be utilized to implement at least a portion of the FIG. 1 system.
Figure 7:
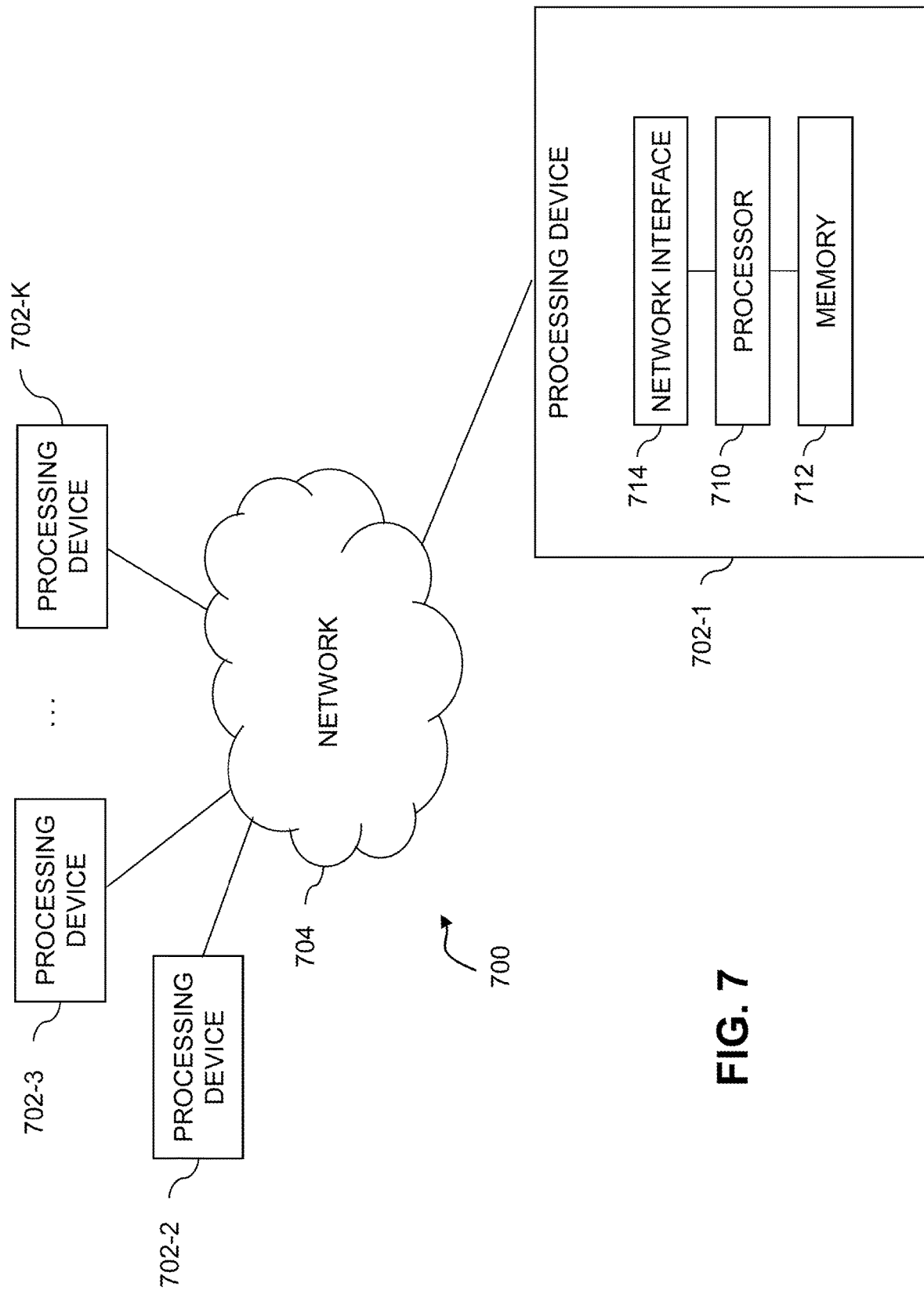

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises virtual machines (VMs) 602-1, 602-2, . . . 602-L implemented using a hypervisor 604. The hypervisor 604 runs on physical infrastructure 605. The cloud infrastructure 600 further comprises sets of applications 610-1, 610-2, . . . 610-L running on respective ones of the virtual machines 602-1, 602-2, . . . 602-L under the control of the hypervisor 604.

Although only a single hypervisor 604 is shown in the embodiment of FIG. 6, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a hypervisor platform that may be used to implement hypervisor 604 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

Such storage systems can comprise any of a variety of different types of storage including network-attached storage (NAS), storage area networks (SANs), direct-attached storage (DAS) and distributed DAS, as well as combinations of these and other storage types, including software-defined storage.

Particular types of storage products that can be used in implementing a given storage system in an illustrative embodiment include VNX® and Symmetrix VMAX® storage arrays, all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

These and numerous other alternative cloud computing environments or other types of processing platforms can be configured to implement functionality for measuring code sharing of software modules as disclosed herein.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality described herein for measuring code sharing of software modules utilizing fingerprinting of assembly functions are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems in which it is desirable to provide functionality for measuring code sharing described herein. Also, the particular configurations of system and device elements shown in the figures can be varied in other embodiments. Thus, for example, the particular type of software modules deployed in a given embodiment and their respective configurations may be varied. Other features of the illustrative embodiments can also be varied. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. A method comprising:
obtaining assembly code of a first software module, the first software module comprising at least one binary file, the assembly code comprising one or more assembly functions each comprising at least one basic block;
transforming the assembly code of the basic blocks of the first software module, wherein transforming the assembly code of the first software module comprises, for a given one of the basic blocks comprising two or more assembly instructions in a designated sequence, retaining the designated sequence of the two or more assembly instructions while removing at least one of address information and compiler-dependent relative offsets in at least one of the two or more assembly instructions;
computing fingerprints of the transformed assembly code of the basic blocks of the first software module by application of a fuzzy hash function;
generating a representation of the first software module as a set of assembly functions, each assembly function being represented as a sequence of fingerprints of its associated basic blocks;
determining a similarity score between the first software module and at least a second software module classified as a given software module type, the similarity score being based on distances between the fingerprints of the basic blocks of the assembly functions of the first software module and fingerprints of basic blocks of assembly functions of the second software module;
determining a measure of code sharing between the first software module and the second software module based on the similarity score; and
modifying access by a given client device to the first software module responsive to the measure of code sharing between the first software module and the second software module exceeding a designated threshold;
wherein removing at least one of address information and compiler-dependent relative offsets in at least one of the two or more assembly instructions comprises replacing said at least one of the address information and the compiler-dependent relative offsets with a designated string value;
wherein the method is performed by at least one processing device comprising a processor coupled to a memory.

2. The method of claim 1 wherein the given software module type comprises one of malware and adware.

3. The method of claim 1 wherein the at least one binary file comprises one of a binary executable file and a dynamic link library module.

4. The method of claim 1 wherein transforming the assembly code of the first software module comprises, for the given basic block:
stripping hexadecimal addresses of each of the two or more assembly instructions;
retaining in sequence the two or more assembly instructions and their arguments; and
transforming operands of the two or more assembly instructions by replacing compiler-dependent relative offsets with the designated string value.

5. The method of claim 4 wherein a given one of the compiler-dependent relative offsets comprises a given hexadecimal addresses and at least one of a hexadecimal offset, mask and number.

6. The method of claim 4 further comprising removing no-operand assembly instructions from the assembly code of the first software module and recording a number of no-operand assembly instructions in the assembly code of the first software module, wherein determining the measure of code sharing between the first software module and the second software module is further based on the number of no-operand assembly instructions.

7. The method of claim 1 wherein the representation of a given assembly function of the first software module comprises:
   a unique identifier;
   a length of the given assembly function; and
   a sequence of fingerprints that follows a sequence in which the corresponding basic blocks form a body of the given assembly function.

8. The method of claim 7 wherein the length of the given assembly function is measured in at least one of bytes and a number of assembly instructions.

9. The method of claim 1 wherein determining the similarity score between the first software module and the second software module comprises:
   measuring a number of assembly functions of the first software module that have shared assembly code with the second software module;
   measuring a length of the assembly code of the first software module that belongs to assembly functions that have shared assembly code with the second software module;
   computing a fraction of the assembly functions of the first software module that have shared assembly code with the second software module; and
   computing a fraction of the length of the assembly code of the first software module that belongs to assembly functions that have shared assembly code with the second software module.

10. The method of claim 9 wherein the similarity score comprises an average similarity score determined as a first ratio of:
   a sum of pairwise similarity scores for pairs of assembly functions in the first software module and the second software module that have shared assembly code; and
   the number of assembly functions of the first software module and the second software module that have shared assembly code.

11. The method of claim 10 wherein the first ratio is weighted by the sizes of the pairs of assembly functions.

12. The method of claim 10 wherein the pairwise similarity score for a given pair of assembly functions comprising a first assembly function in the first software module and a second assembly function in the second software module comprises a second ratio of:
   a sum of fuzzy hash similarity scores between basic blocks of the first assembly function and the second assembly function that exceed a designated fuzzy hash threshold similarity score; and
   a number of basic blocks in common between the first assembly function and the second assembly function.

13. The method of claim 12 wherein the pairwise similarity score for the given pair of assembly functions is based on comparing the basic blocks of the first assembly function in sequence with the basic blocks of the second assembly function.

14. The method of claim 12 wherein the second ratio is weighted by the number of instructions in the basic blocks.

15. The method of claim 1 wherein modifying access by the given client device to the first software module comprises at least one of:
   removing the first software module from a memory or storage of the given client device;
   preventing the given client device from obtaining the first software module; and
   causing the first software module to be opened in a sandboxed application environment on the given client device.

16. The method of claim 1 wherein obtaining the assembly code of the first software module comprises disassembling the at least one binary file.

17. A computer program product comprising a non-transitory processor-readable storage medium having stored therein program code of one or more software programs, wherein the program code when executed by at least one processing device cause the at least one processing device:
   to obtain assembly code of a first software module, the first software module comprising at least one binary file, the assembly code comprising one or more assembly functions each comprising at least one basic block;
   to transform the assembly code of the basic blocks of the first software module, wherein transforming the assembly code of the first software module comprises, for a given one of the basic blocks comprising two or more assembly instructions in a designated sequence, retaining the designated sequence of the two or more assembly instructions while removing at least one of address information and compiler-dependent relative offsets in at least one of the two or more assembly instructions;
   to compute fingerprints of the transformed assembly code of the basic blocks of the first software module by application of a fuzzy hash function;
   to generate a representation of the first software module as a set of assembly functions, each assembly function being represented as a sequence of fingerprints of its associated basic blocks;
   to determine a similarity score between the first software module and at least a second software module classified as a given software module type, the similarity score being based on distances between the fingerprints of the basic blocks of the assembly functions of the first software module and fingerprints of basic blocks of assembly functions of the second software module;
   to determine a measure of code sharing between the first software module and the second software module based on the similarity score; and
   to modify access by a given client device to the first software module responsive to the measure of code sharing between the first software module and the second software module exceeding a designated threshold;
   wherein removing at least one of address information and compiler-dependent relative offsets in at least one of the two or more assembly instructions comprises replacing said at least one of the address information and the compiler-dependent relative offsets with a designated string value.

18. The computer program product of claim 17 wherein the representation of a given assembly function of the of the software module comprises:
   a unique identifier;
   a length of the given assembly function; and
   a sequence of fingerprints that follows a sequence in which the corresponding basic blocks form a body of the given assembly function.

19. An apparatus comprising:
   at least one processing device comprising a processor coupled to a memory;

the at least one processing device being configured:
- to obtain assembly code of a first software module, the first software module comprising at least one binary file, the assembly code comprising one or more assembly functions each comprising at least one basic block;
- to transform the assembly code of the basic blocks of the first software module, wherein transforming the assembly code of the first software module comprises, for a given one of the basic blocks comprising two or more assembly instructions in a designated sequence, retaining the designated sequence of the two or more assembly instructions while removing at least one of address information and compiler-dependent relative offsets in at least one of the two or more assembly instructions;
- to compute fingerprints of the transformed assembly code of the basic blocks of the first software module by application of a fuzzy hash function;
- to generate a representation of the first software module as a set of assembly functions, each assembly function being represented as a sequence of fingerprints of its associated basic blocks;
- to determine a similarity score between the first software module and at least a second software module classified as a given software module type, the similarity score being based on distances between the fingerprints of the basic blocks of the assembly functions of the first software module and fingerprints of basic blocks of assembly functions of the second software module;
- to determine a measure of code sharing between the first software module and the second software module based on the similarity score; and
- to modify access by a given client device to the first software module responsive to the measure of code sharing between the first software module and the second software module exceeding a designated threshold;

wherein removing at least one of address information and compiler-dependent relative offsets in at least one of the two or more assembly instructions comprises replacing said at least one of the address information and the compiler-dependent relative offsets with a designated string value.

20. The apparatus of claim 19 wherein the representation of a given assembly function of the of the software module comprises:
- a unique identifier;
- a length of the given assembly function; and
- a sequence of fingerprints that follows a sequence in which the corresponding basic blocks form a body of the given assembly function.

* * * * *